United States Patent [19]

Osajda et al.

[11] Patent Number: 5,957,988
[45] Date of Patent: Sep. 28, 1999

[54] CONTROL CIRCUIT FOR CONTROLLING POWER SUPPLIED TO AN IGNITER ELEMENT AND IGNITER SYSTEM

[75] Inventors: Marc Osajda, Toulouse; Jerome Conraux, Ludres, both of France

[73] Assignee: Motorola, Inc., Schaumburg, Ill.

[21] Appl. No.: 08/930,294

[22] PCT Filed: Feb. 3, 1997

[86] PCT No.: PCT/EP97/00478

§ 371 Date: Apr. 3, 1998

§ 102(e) Date: Apr. 3, 1998

[87] PCT Pub. No.: WO97/29932

PCT Pub. Date: Aug. 21, 1997

[30] Foreign Application Priority Data

Feb. 12, 1996 [FR] France .................................. 96 01675

[51] Int. Cl.[6] .................................................. B60R 21/32
[52] U.S. Cl. ........................................... 701/45; 280/735
[58] Field of Search ............................... 701/45; 280/735

[56] References Cited

U.S. PATENT DOCUMENTS

| | | | |
|---|---|---|---|
| 3,877,720 | 4/1975 | Upmeier et al. | 280/150 |
| 4,359,715 | 11/1982 | Langer et al. | 340/52 R |
| 4,381,829 | 5/1983 | Montaron | 180/274 |
| 4,950,914 | 8/1990 | Kurihara et al. | 307/10.1 |
| 5,041,817 | 8/1991 | Reeb | 340/635 |
| 5,422,965 | 6/1995 | Bekki et al. | 364/424.05 |
| 5,596,497 | 1/1997 | Honda | 701/45 |
| 5,659,474 | 8/1997 | Maeno et al. | 701/45 |
| 5,749,059 | 5/1998 | Walton | 701/45 |
| 5,779,264 | 7/1998 | De Mersseman et al. | 280/735 |

*Primary Examiner*—William A. Cuchlinski, Jr.
*Assistant Examiner*—Olga Hernandez
*Attorney, Agent, or Firm*—Rennie W. Dover

[57] ABSTRACT

A control circuit (52) for controlling power supplied to an igniter element (54), includes a first input (70) for receiving an encoded input signal generated in response to the initiation of a firing mode and a diagnostic mode. The encoded input signal comprises a code portion (100) having at least two pulses, and a power portion (102). Logic circuitry (74) determines whether the code portion (100) is valid, the code portion (100) being determined valid when it meets predefined conditions within a predetermined time window, and provides an unlocking signal (Sfire) at an output (76) when the code portion (100) is determined to be valid. A switch (78), which has a control input coupled to the output (76) of the logic circuitry (74), is enabled on receipt of the unlocking signal so that power at the first input (70) of the control circuit (52) is supplied to the output of the switch for energizing the igniter element (54). In the firing mode, the power supplied via the enabled switch is sufficient to fire the igniter element (54). In the diagnostic mode, the power portion supplied via the enabled switch energizes but does not fire the igniter element (54) such that diagnostics can be performed.

17 Claims, 5 Drawing Sheets

CONTROL CIRCUIT FOR CONTROLLING POWER SUPPLIED TO AN IGNITER ELEMENT AND IGNITER SYSTEM

FIELD OF THE INVENTION

This invention relates to a control circuit for controlling power supplied to an igniter element and an igniter system.

BACKGROUND OF THE INVENTION

Igniter devices are used commonly in applications such as airbag deployment and seat belt pretensioner activation in cars. The igniter device comprises an igniter element which converts electrical energy to heat. Typically, the igniter element comprises a hot wire bridge which is heated by a current of 1 Amp (A) or more. In, for example, airbag applications, the heat generated in the igniter element ignites a pyrotechnic material adjacent the heater element which burns a propellant. This produces gas to inflate the airbag.

A particular concern to automotive manufacturers is the possibility of igniter devices firing inadvertently due to a fault. For example, inadvertent firing of an airbag igniter device could have serious consequences for a driver whilst driving. Two of the major type of faults which can occur in igniter devices are: 1) improper connections to either side of the igniter element; and 2) faulty igniter elements themselves. It is therefore common to have both high and low side switches coupled to the igniter element by wires to ensure that a fault, such as improper connection to the igniter element, does not fire the igniter device.

However, the igniter device may still be inadvertently fired due to Electrical Static Discharge (ESD) and/or RF energy induced in the long wires between the high and low side switches and the igniter element. This problem can be mitigated by using a hot wire bridge igniter element which has a low resistance of 2 ohms and 1.5 Amps (A) for 3 ms firing conditions. That is, 13 milli-Joules (mJ) of energy is required to fire the hot wire bridge. The required firing energy is thus relatively high compared to the typical ESD and RF induced energies and thus this solution provides some protection against induced currents. However, in view of the increase in RF sources such as GSM radios, repeaters and electromagnetic interferences, automotive manufacturers consider that this form of protection is not sufficient.

A further disadvantage of using a low resistance igniter element is that the high and low side switches have to supply a current of 1 A or more and therefore require the use of oversized MOSFET power transistors which have an on-resistance $R_{dson}$ in the range of 2 ohms, like the igniter element itself. Such high and low side switches are therefore expensive and require large die area. Furthermore, about 66% of the available energy is lost through the high and low side switches which means that the efficiency of the firing loop is relatively low. Under these conditions, the level of energy that must be stored in the reservoir capacitors, which are used to fire an airbag igniter element should the battery be disconnected or shorted during a crash, is very high.

Airbag igniter devices are safety devices which are not intended to explode in normal driving conditions but must explode when fired due to an accident. It is therefore necessary to make regular diagnostics to ensure that the igniter is able to work in case of an accident over the given lifetime of the airbag equipment (typically 15 years). In fact, airbag manufacturers are now requiring that diagnostics be provided for all airbag igniter devices.

A typical diagnostic system uses current limited voltage sources or current sources to test for improper connections to either side of the igniter element. A diagnostic current which is less than the current required to fire the igniter element is applied and the voltage at one or the other end of the igniter element is measured to check for shorts to battery, shorts to ground and open firing loops. Typical diagnostic currents are in the range of 15 to 30 mA. By measuring the diagnostic voltage across the igniter element for a given diagnostic current, it is also possible to determine the resistance of the igniter element and whether the resistance changes. If the resistance of the igniter element changes by too much, the igniter device may not fire and a warning signal can be generated by a processor.

As mentioned above, in order that the hot wire bridge igniter element is not fired in error due to ESD and RF induced currents, the resistance of the hot wire igniter element is chosen to be relatively small at about 2 ohms. However, this means that with diagnostic currents in the range of 15 to 30 mA, the diagnostic voltages to be measured are relatively small (less than 60 mv). Thus, it is difficult to determine the voltage and hence the resistance of the igniter element accurately. Precision measurement circuits may be used but this increases cost, complexity and size of the diagnostic circuit.

Some of these problems can be overcome using a semiconductor igniter element in place of a hot wire bridge igniter element. U.S. Pat. No. 4,843,964 and French patent application no. FR 9409894, each describes a semiconductor igniter element comprising an electrical material (such as a highly doped semiconductor) formed as a bridge of small size and extending between two spaced conductive pads. Such semiconductor igniter elements are also known as semiconductor bridge igniter elements. Semiconductor igniter elements have advantages over hot wire bridge igniter elements since they have a more narrowly defined firing current or energy and they become open circuited once fired.

The use of a semiconductor igniter element in an igniter device will improve and reduce the cost of the igniter device since the firing current of the semiconductor igniter is narrowly defined and the level of energy required to fire the device is reduced (less than 1 mJ). These improvements also mean that the size of the high and low side power transistors can be reduced and also the level of the energy stored in the reservoir capacitor. However, the sensitivity of such a device incorporating a semiconductor igniter to external energies, such as ESD and RF, increases.

There is therefore a need for a 'smart' igniter which igniter is only fired by a specific code and has increased insensitivity to external energies.

Development of smart igniters for mining applications has been going on for some time. The purpose of using encoded smart igniters in mining applications is to build a network of igniters and sequentially fire the igniters using a computer, see for example U.S. Pat. No. 4,819,560. The kind of devices which have been developed for mining applications are relatively complex, use at least 3 wires per device, need too much energy and do not fulfil the automotive specifications in terms of package, size, compatibility with existing solutions and cost. Another drawback is that mining igniter devices are not designed as safety devices and are produced to be fired at 100% in a relatively short time after production which are opposite requirements to automotive igniter devices U.S. Pat. No. 5,225,986 discloses an igniter system having a hot wire bridge igniter element, an electronic lock and a controlled switch. The igniter element is only fired after transmission of an unlocking code which corresponds to a specific code of the electronic lock. Such a system is therefore substantially immune to the affects of external energies such as ESD and RF. However, the igniter system disclosed in this U.S. patent has no diagnostic circuits and suffers from the disadvantages outlined above with respect to a low resistance hot wire bridge element.

There is therefore a need to provide an improved control circuit for controlling the firing of an igniter element wherein the above problems and disadvantages are mitigated.

SUMMARY OF THE INVENTION

In accordance with the present invention there is provided a control circuit for controlling power supplied to an igniter element, the control circuit comprising:

a first input for receiving an encoded input signal generated in response to the initiation of a firing mode or a diagnostic mode, the encoded input signal comprising a code portion and a power portion, the code portion comprising n pulses having substantially a predetermined frequency, where n is at least two;

logic means for determining whether the code portion of the received encoded input signal is valid, the code portion being determined valid when the code portion meets predefined conditions within a predetermined time window and for providing an unlocking signal at an output when the code portion is determined to be valid; and a switch having a control input coupled to the output of the logic means, an input coupled to the first input of the control circuit, and an output for coupling to the igniter element, wherein the switch is enabled on receipt of the unlocking signal such that power, including the power portion of the received encoded input signal, at the first input of the control circuit is supplied to the output of the switch for energising the igniter element wherein in the firing mode the power supplied via the enabled switch fires the igniter element.

Thus, the present invention provides a control circuit having enhanced security for controlling the power supplied to an igniter element in automotive or other electronic firing systems.

Preferably, the logic means comprises:

a counter having a clock input coupled to the input of the control circuit so as to receive the encoded input signal for counting each pulse in the code portion of the encoded input signal;

a first logic circuit coupled to the counter for determining the number of pulses in the code portion and for providing a valid signal when the code portion is determined to comprise n pulses and a reset signal when the code portion is determined to comprise any other number of pulses;

a second logic circuit coupled to the counter for determining whether the code portion meets predefined conditions within the predetermined time window, the predefined conditions including a condition that the predetermined frequency of the code portion is within a predetermined range, and for providing a valid signal when the predefined conditions are met within the predetermined time window and a reset signal when the predefined conditions are not met within the predetermined time window; and an unlocking circuit coupled to receive the valid signals and reset signals from the first and second logic circuits, for generating the unlocking signal on receipt of the valid signals from both the first and second logic circuits and for being reset in response to receiving a reset signal from one of the first and second logic circuits.

In a preferred embodiment, the control circuit further comprises a power supply coupled between the first input of the control circuit and a second input of the control circuit which second input is coupled to a reference voltage, and wherein the power supply derives energy from the encoded input signal so as to supply power at an output to the logic means. Such a preferred arrangement has an advantage in that only two connection wires are required to the control circuit.

The igniter element preferably comprises a semiconductor igniter element. Thus, an igniter device comprising a semiconductor igniter element and a control circuit in accordance with the invention may be integrated in a single chip with just two connection wires.

An igniter system incorporating the control circuit in accordance with present invention is also disclosed and claimed.

BRIEF DESCRIPTION OF THE DRAWINGS

A control circuit, in accordance with the present invention and an igniter system comprising the control circuit in accordance with the present invention will now be described, by way of example only, with reference to the accompanying drawings in which.

DETAILED DESCRIPTION

Figure 1:
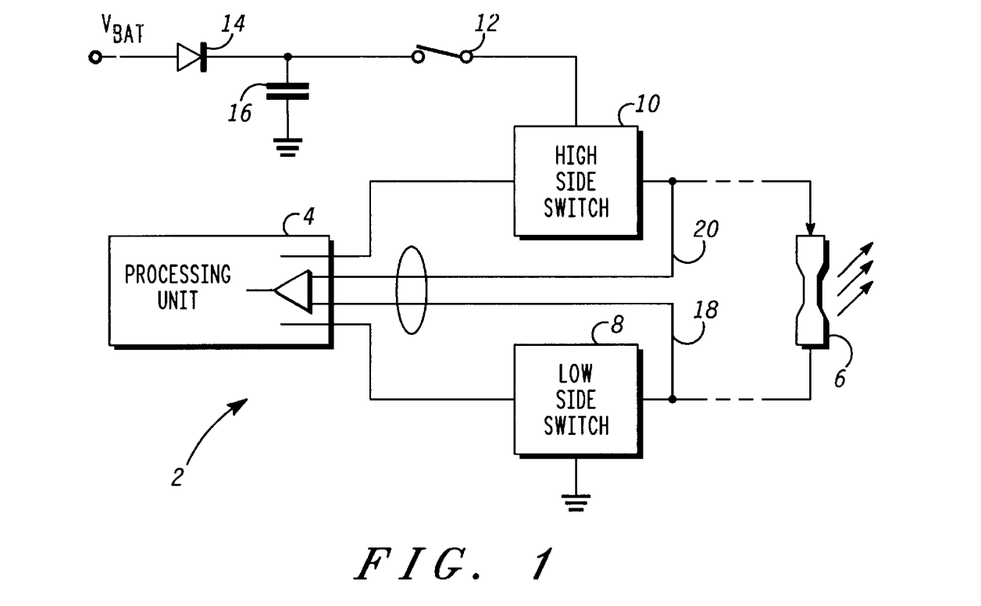
FIG. 1 is a block schematic diagram of an known igniter system

FIG. 1 shows a known igniter system 2 comprising a processing unit 4 for generating the firing signal when an accident occurs and for performing diagnostics, and a hot wire bridge igniter element 6. A low side switch 8 couples a first terminal of the igniter element 6 to ground and a high side switch 10 couples a second terminal of the igniter element 6 to a battery voltage (Vbat) via a switch 12, which may be a mechanical crash sensor, and a diode 14. A reservoir capacitor 16, coupled to a node between the diode and switch 12, ensures that when an accident occurs and switch 12 and high side switch 10 are closed, sufficient power is provided to fire the igniter element 6 even when the battery has been disconnected. The high side switch 10 and low side switch 8 are opened and closed under the control of the processing unit 4.

When an accident occurs, the igniter system 2 operates in a firing mode wherein switch 12 is closed, the processing unit 4 closes both the low 8 and high 10 side switches so that current from the battery flows through the igniter element 6, and heats the element until it fires and ignites adjacent pyrotechnic material (not shown). The hot wire bridge igniter element 6 has a resistance of 2 ohms and is fired when a current of 1.5 A flows therethrough for 2 ms.

The igniter system 2 also operates in a diagnostic mode wherein a current of between 15 and 30 mA is passed through the igniter element 6 and the voltage signal across the igniter element 6 is provided to the processing unit 4 via diagnostic wires 18, 20. The processing unit uses the voltage signal to determine the resistance of the igniter element 6 and to determine whether the first and second terminals of the igniter element 6 are open circuit, short circuit to battery or ground.

As discussed above, such a known system suffers from a number of problems. The system requires two expensive MOSFET transistors to implement the high side 10 and low side 8 switches. Furthermore, in order to reduce errors due to the effects of ESD and RF energies, the resistance of the igniter element 6 must be kept small but this makes it harder to measure the voltage across the igniter element 6 accurately in the diagnostic mode. It is particularly difficult to measure voltages in the range of 100 mv accurately in noisy automotive environments. The present invention seeks to overcome these problems.

Figure 2:
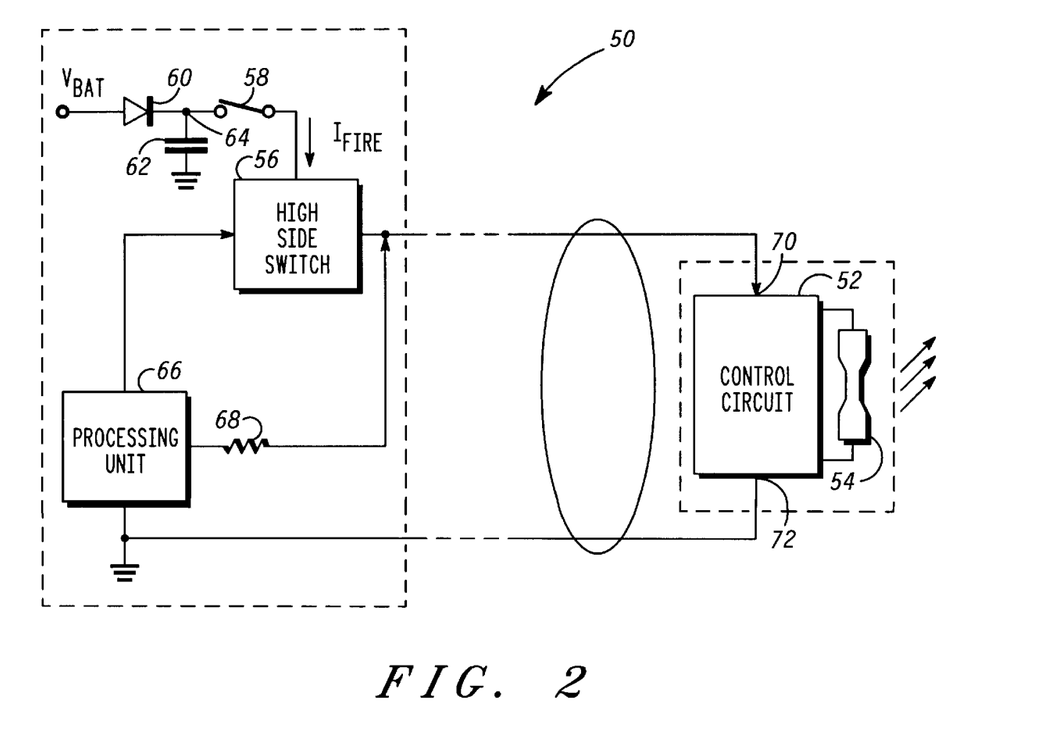
FIG. 2 is a block schematic diagram of an igniter system in accordance with the present invention.

Referring now to FIG. 2, an igniter system 50 in accordance with a preferred embodiment of the invention comprises a control circuit 52 for controlling the power supplied to an igniter element 54. The control circuit 52 has a first input 70 coupled to a first voltage supply, battery voltage (Vbat), via a high side switch 56, a switch 58 and a diode 60 and a second input 72 coupled to a reference voltage, preferably ground. A reservoir capacitor 62 is coupled to a node 64 between the switch 58, which may be a mechanical crash sensor, and the diode 60. The high side switch 56 is open and closed under the control of a processing unit 66 which supplies a signal to a control input of the high side switch 56. Processing unit 66 may be an airbag MCU. An encoded input signal is supplied under the control of the processing unit 66 via a load resistor 68 to the first input 70 of the control circuit 52.

In the preferred embodiment, the igniter element 54 comprises a semiconductor igniter element. The control circuit 52 and the igniter element 54 can therefore be integrated onto one igniter device chip which significantly improves EMC performance.

Figure 3:
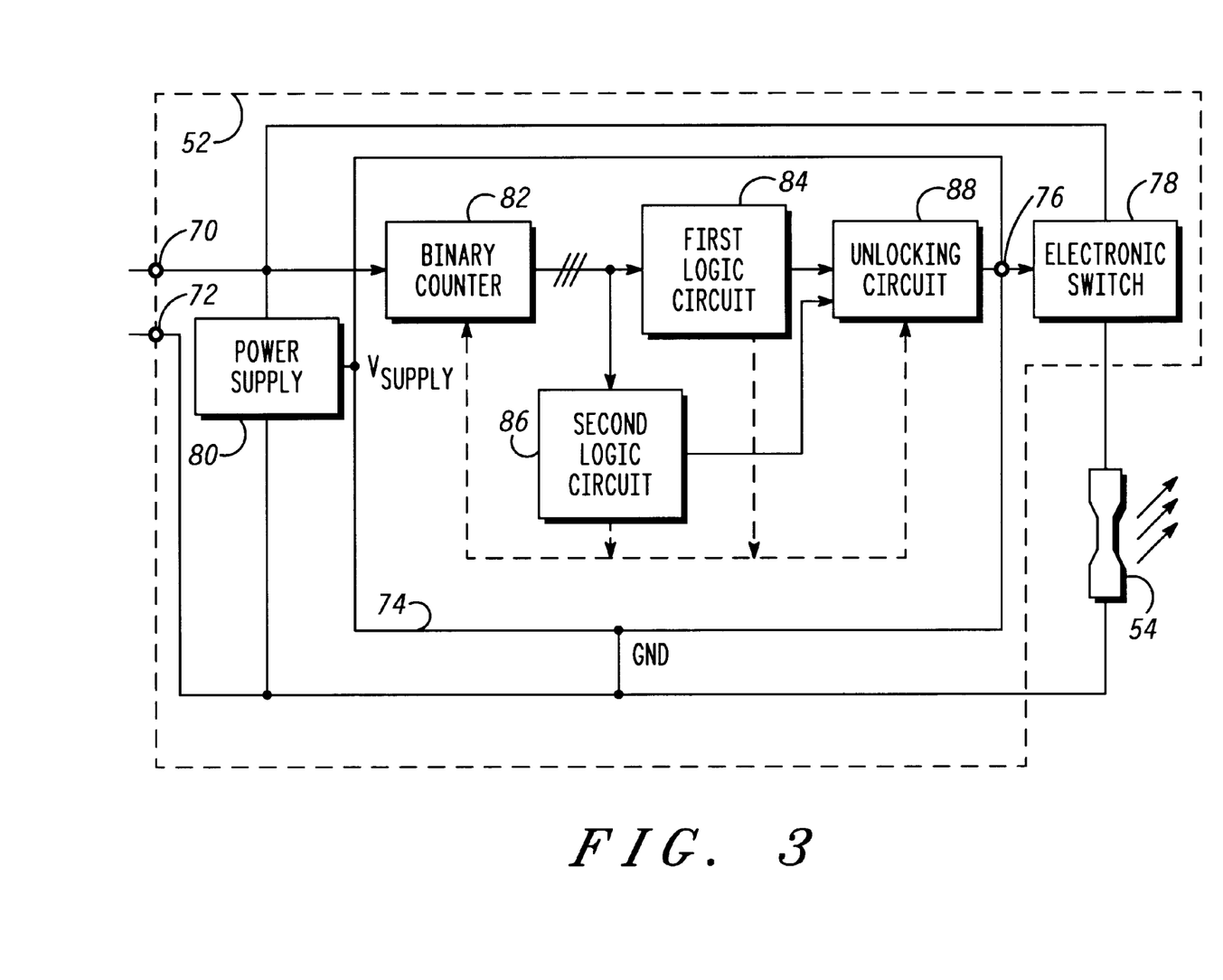
FIG. 3 is a block schematic diagram of a control circuit in accordance with the present invention for use in the igniter system of FIG. 2.

Referring now also to FIG. 3 which shows the control circuit 52 in accordance with the preferred embodiment in more detail.

Figure 4:
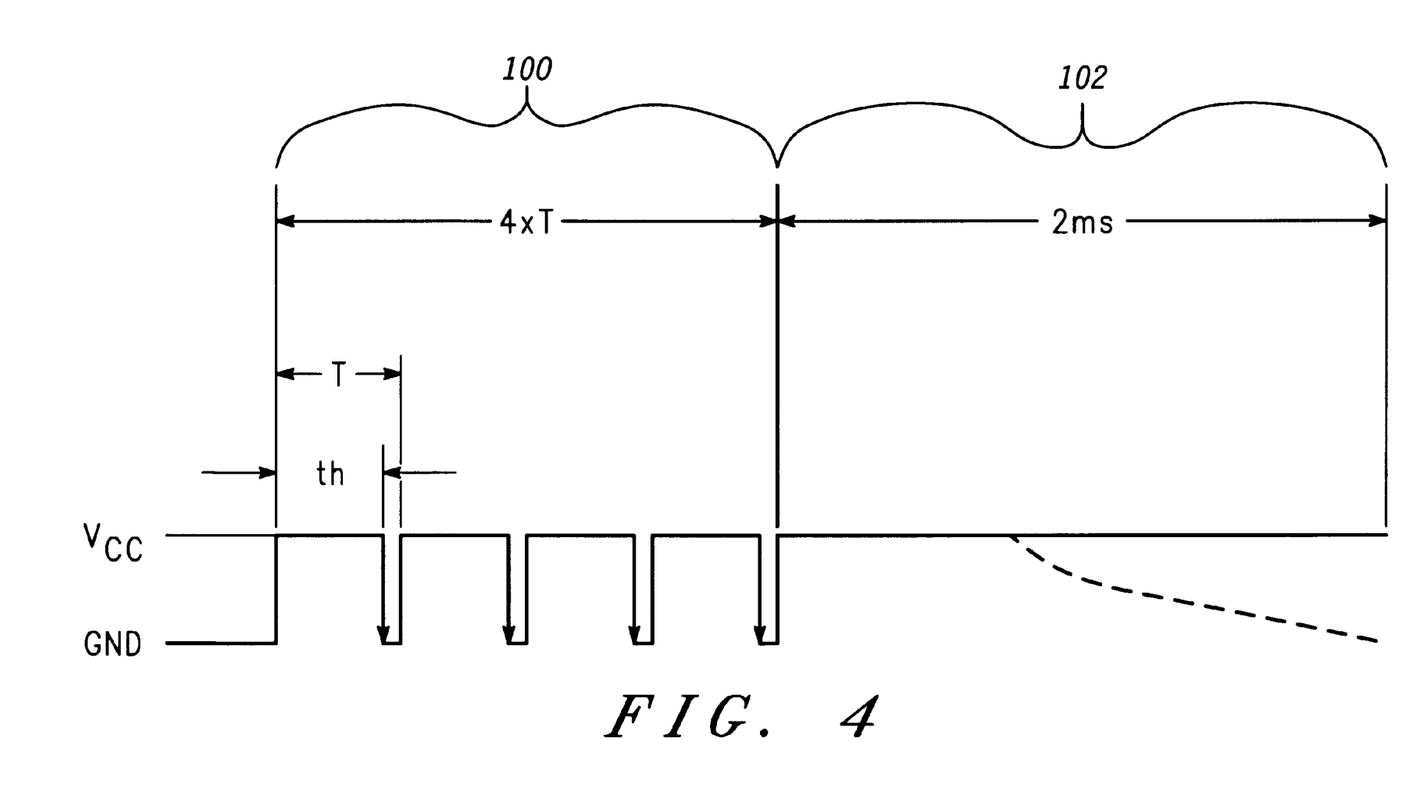
FIG. 4 is a representation of an encoded input signal supplied to the control circuit of FIG. 3 in a firing mode or diagnostic mode.

The first input 70 of the control circuit 52 is coupled to receive the encoded input signal generated by the processing unit 66, such as the encoded input signal shown in FIG. 4, and the second input 72 is coupled to ground. The encoded input signal comprises a code portion 100 and a power portion 102. The code portion comprises at least two pulses having substantially the same frequency (1/T). The preferred number of pulses is four, which number allows the code portion to be verified in a reasonable time and with significantly less risk of parasitics corrupting the verification process. The following description will however be directed to a code portion 100 comprising four pulses but it is not intended that the invention be limited to a four pulse code portion. Preferably, the code portion has a duration of less than 6 $\mu$s. The power portion 102 comprises a signal having a constant voltage level Vcc or one which decays with time as shown by the dotted lines on FIG. 4. The power portion 102 does not supply enough power to fire the igniter element 54.

The control circuit 52 comprises logic means 74 coupled to the first input 70 for determining whether the code portion of a received encoded input signal is valid and for providing an unlocking signal at an output 76 when the code portion is determined to be valid. The control circuit further comprises a switch 78 having an input coupled to the first input 70, a control input coupled to the output 76 of the logic means 74 and an output coupled to the igniter element 54. The switch 78 is enabled in response to receiving the unlocking signal at its control input and when enabled, supplies the power portion 102 of the received signal to the igniter element. The switch 78 may comprise a MOS transistor or a thyristor or any other type of switch.

A power supply 80 supplies power to the logic means 74 and derives its energy from the received encoded input signal.

The logic means 74 comprises a counter 82 which is clocked by the received encoded input signal for counting the number of pulses in the code portion 100 of the received encoded input signal. An output of the counter 82 is coupled both to a first logic circuit 84 and a second logic circuit 86. The first logic circuit 84 determines the number of pulses in the code portion 100 and provides a valid signal to an unlocking circuit 88 when the code portion 100 comprises only four pulses and a reset signal when the code portion 100 comprises any number of pulses other than four. The second logic circuit 86 determines whether the code portion 100 meets predefined conditions within a predetermined time window and if it does, a valid signal is provided to the unlocking circuit 88 but if it does not, a reset signal is generated. The unlocking circuit 88 on receipt of valid signals from both the first 84 and second 86 logic circuits, which indicates that the code portion is valid, then generates the unlocking signal. If either of the first 84 or second 86 logic circuits generate a reset signal, the counter 82 and unlocking circuit 88 are reset.

Figure 5:
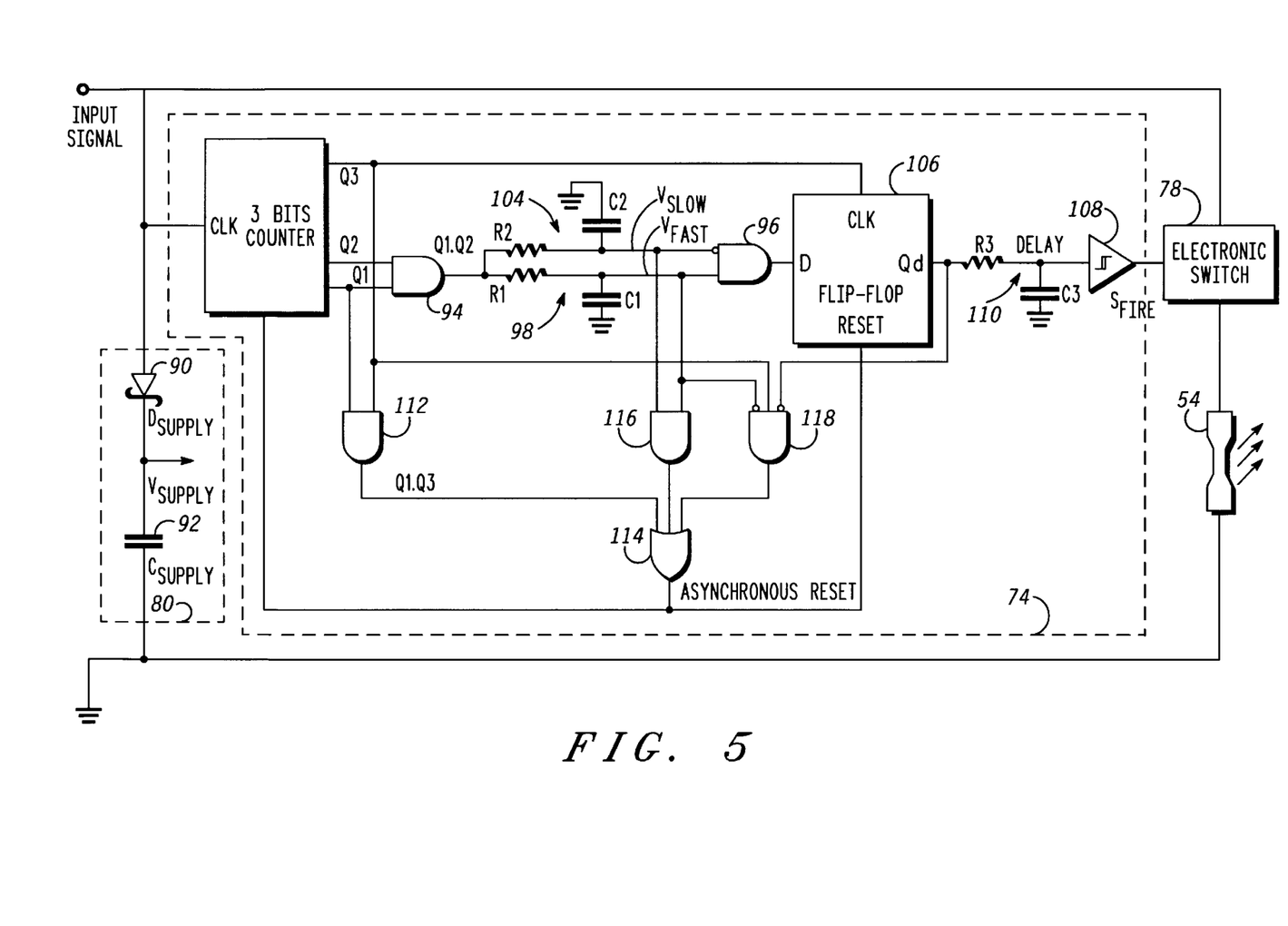
FIG. 5 is a more detailed circuit diagram of the control circuit of FIG. 3.

FIG. 5 shows the logic means 74 and power supply 80 in accordance with the preferred embodiment in more detail.

The power supply 80 comprises a Shottky diode 90 and a capacitor 92 and supplies a voltage supply signal Vsupply to each of the logic gates of the logic means 74. The value of the capacitor 92 depends on the maximum level of the received encoded input signal and overall consumption of the logic means 74. Since the received encoded input signal (FIG. 4) is used to power the logic means 74, the code portion 100 must have a high duty signal, in the order of th/T=90%, and a relatively high frequency (T is approximately 1 $\mu$s).

The counter 82 is clocked by the received encoded input signal so as to provide three output signals Q1, Q2, Q3. The first Q1 and second Q2 output signals are coupled to respective inputs of a first AND logic gate 94. The output signal (Q1.Q2) of first AND logic gate 94 is coupled to first 98 and second 104 delay circuits. Each of the first 98 and second 104 delay circuits comprise a resistor and capacitor whose values are chosen so that the time constant or first predetermined delay of the first delay circuit 98 is less than the second predetermined delay of the second delay circuit 104 (R1C1<R2C2). The first delay circuit 98 provides a first delayed output signal Vfast to a first input of a second AND logic gate 96 and the second delay circuit 104 provides a second delayed output signal Vslow to a second inverted input of the second AND logic gate 96. The output signal $\overline{\text{Vslow}}.\text{Vfast}$ of the second AND logic gate 96 is coupled to a data input D of a latch, such as a D-type flip-flop 106.

The first 98 and second 104 delay circuits determine the time window in which the code portion 100 must meet predefined conditions in order for the code portion 100 to be determined to be valid.

The flip-flop 106 is clocked by the third output signal D3 provided by the counter 82. The signal Qd at the output of the flip-flop 106 is coupled to a Schmitt trigger 108 via a third RC delay circuit 110. The signal Sfire at the output of the Schmitt trigger 108 provides the unlocking signal which is coupled to the control input of the switch 78. The unlocking circuit 88 comprises the flip-flop 106, Schmitt trigger 108, and the third delay circuit 110.

The first Q1 and third Q3 output signals provided by the counter 82 are also coupled to respective inputs of a third AND logic gate 112. The output signal Q1.Q3 of the third AND logic gate 112 is coupled to a first input of an OR logic gate 114.

The first and second delayed output signals Vfast and Vslow of the first 98 and second 104 delay circuits are coupled to respective inputs of a fourth AND logic gate 116. The output signal Vslow.Vfast of the fourth AND logic gate 116 is coupled to a second input of the OR logic gate 114.

The third output signal Q3 of the counter 82, the inverse $\overline{\text{Vfast}}$ of the first delayed output signal of the first delay circuit 98 and the inverse $\overline{\text{Qd}}$ of the output signal of the flip-flop 106 are coupled to respective inputs of a fifth AND logic gate 118. The output signal $\overline{\text{Vfast}}.\text{Q3}.\overline{\text{Qd}}$ of the fifth AND logic gate 118 is coupled to a third input of the OR logic gate 114. The output signal of the OR logic gate 114 provides the reset signal which is coupled to the reset input of the counter 82 and the reset input of the flip-flop 106.

The first logic circuit 84 comprises the third AND logic gate 112 and the third output signal Q3 which clocks the flip-flop 106 and the second logic circuit 86 comprises the first 94, second 96, fourth 116 and fifth 118 AND logic gates, and the first 98 and second 104 delay circuits.

The operation of the control circuit 52 in accordance with the present invention to verify the validity of the code portion 100 of a received encoded input signal and to unlock the igniter element 54 will now be described with reference also to FIG. 6 which shows the timing diagrams for the signals generated by the different components of control circuit 52.

In order to unlock the igniter element 54, the processing unit 66 generates the encoded input signal which it supplies to the first input 70 of the control circuit 52 via load resistor 68. The first rising edge of the encoded input signal is used to charge the capacitor 92 through the Shottky diode 90. No limitation resistor is used to ensure that the capacitor 92 is correctly charged after the first pulse in a very short time. The energy which is stored in capacitor 92 is used as power supply Vsupply for the logic means 74.

Figure 6:
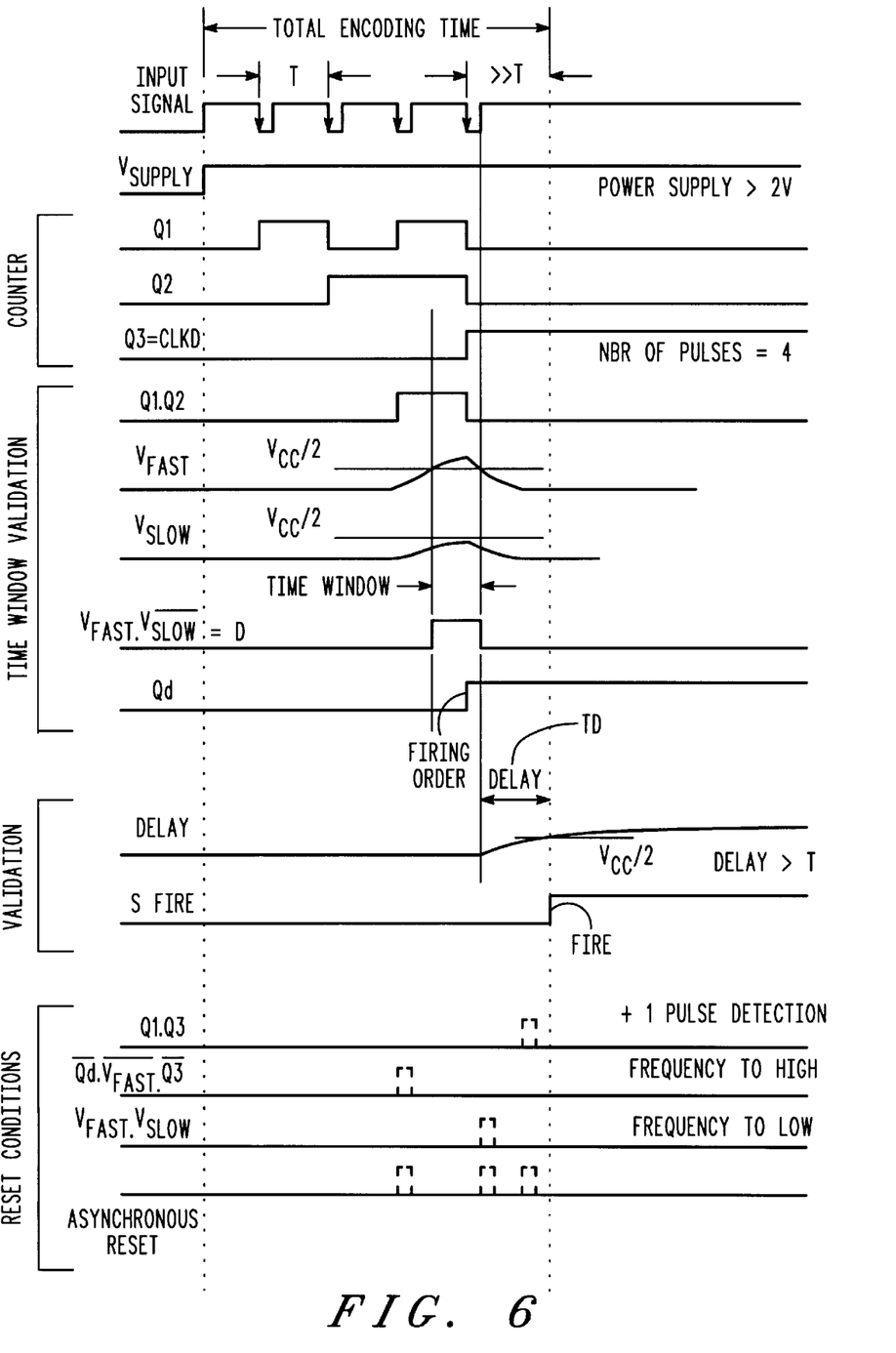
FIG. 6 shows timing diagrams for signals generated by the control circuit of FIG. 5.

The four consecutive falling edges of the code portion of the encoded input signal are used as the clock signal for the counter 82 which generates the three output signals Q1, Q2, Q3 as shown in the timing diagrams of FIG. 6. The output signal Q1.Q2 of the first AND logic gate 94 clurges the capacitances C1, C2 of respective first 98 and second 104 delay circuits so as to provide the first and second delayed output signals Vfast and Vslow respectively. When the first delayed output signal Vfast goes above a predetermined value Vcc/2, the signal at the first input of the second AND logic gate 96 represents a logic '1' and when the second delayed output signal Vslow is below a predetermined value Vcc/2, the inverted signal at the second inverted input of the second AND logic gate 96 also represents a logic '1'. Thus, by selecting appropriate values for the capacitances C1 and C2 and the resistances R1 and R2, the output signal $\overline{\text{Vslow}}.\text{Vfast}$ of the second AND logic gate 96 can be used to set a predetermined time window for the code portion 100.

If the timing conditions are correct, then the output signal $\overline{\text{Vslow}}.\text{Vfast}$ is a logic '1' when the counter's third output signal Q3 changes from logic '0' to a logic '1'. This allows the output signal Qd of the flip-flop 106 to switch from logic '0' to logic '1'. The signal Qd is therefore generated as the counter 82 counts the falling edge of the fourth pulse as long as the timing conditions dictated by the first 98 and second 104 delay circuits are met. In order to ensure that a fifth pulse is not received, a delay 120 is introduced by the third delay circuit 110 and Schmitt trigger 108 which delay Td is shown in FIG. 6 and is defined by the value of the capacitance C3 and resistance R3 (R3.C3>>R2.C2 and Td>>T). The unlocking signal Sfire having a logic '1' is generated once the delay Td has expired and no additional pulse has been counted which indicates that the received code portion is valid. The unlocking signal enables the switch 78 which unlocks the igniter system 50.

It will be appreciated that the code portion 100 of the received encoded input signal must meet certain conditions within the predetermined time window otherwise the unlocking signal (Sfire='1') is not generated. This ensures that perturbations due to, for example, RF or ESD induced energies, should not be recognised as a valid code portion and fire the igniter element. These conditions include the following.

1) The level of the encoded input signal must be greater than a predetermined level, such as 2 V otherwise not enough energy can be stored in the capacitor 92 to supply the logic means 74.

2) The code portion must comprise four falling edges only.

3) The frequency of the code portion must be in a certain range so that the fourth falling edge falls within the time window.

With respect to the second condition, if the number of pulses is less than four, the third output signal Q3 remains a logic '0' and the flip-flops output signal Qd never switches to a logic '1' so the unlocking signal will not be generated. If the number of pulses is greater than four, the logic means 74 works normally up to the R3.C3 time constant. When a fifth pulse arrives, the output signal Q1.Q3 of the third AND logic gate 112 switches to a logic '1', with the result that a reset signal is generated by the OR logic gate 114 as shown by the dotted lines in the reset timing diagrams of FIG. 6, which resets asynchronously the counter 82 and the flip-flop 106 so that the unlocking signal is not generated (Sfire='0').

With respect to the third condition, if the frequency of the code portion is too slow, Vfast>Vcc/2 and Vslow>Vcc/2 so that the output signal Vslow.Vfast of the fourth AND logic gate 116 is a logic '1'. This results in a reset signal being generated by the OR logic gate 114 as shown by the dotted lines in the reset timing diagrams of FIG. 6, which resets asynchronously the counter 82 and the flip-flop 106 so that the unlocking signal is not generated (Sfire='0'). If the frequency of the code portion is too high, the third output signal Q3 will be generated by the counter 82 whilst Vfast<Vcc/2 and/or Vslow<Vcc/2. This means that the output signal $\overline{\text{Vfast}}.\text{Q3}.\overline{\text{Qd}}$ of the fifth AND logic gate 118 is a logic '1', with the result that a reset signal is generated by the OR logic gate 114 as shown by the dotted lines in the reset timing diagrams of FIG. 6, which resets asynchronously the counter 82 and the flip-flop 106 so that the unlocking signal is not generated (Sfire='0').

An advantage of the present invention is that the when the code portion is determined to be invalid, the logic means 74 is reset asynchronously so that all the components of the logic means 74 are reset and in the right condition should the igniter element 54 need to be fired.

The control circuit 52 in accordance with the present invention thus provides enhanced protection against inadvertent firing of the igniter element 54, having three levels of protection corresponding to the three conditions.

In summary, the present invention ensure that the code portion 100 of the received encoded input signal is verified by the logic means 74 to determine whether the code portion is valid. When the logic means 74 determines that the code portion 100 satisfies certain predefined conditions within a predetermined time window, the code portion is determined to be valid and an unlocking signal is generated which enables the switch 78. The power portion of the received encoded input signal is then supplied to the igniter element 54. Thus, the switch 78 is only enabled when the code portion is determined to be valid. This means that power can only be supplied to the igniter element 54 when the logic means 74 verifies that the code portion 100 is valid. Thus, for all received encoded input signals which are determined not to be a valid code portion, the igniter system is locked.

The igniter system 50 is required to be unlocked during a firing mode when an accident occurs and the igniter element 54 is to be fired and during a diagnostic mode when the processing unit 66 carries out diagnostics on the igniter element 54 to determine that the igniter element is functioning correctly. Thus, for both modes, the processing unit 66 provides the encoded input signal comprising a code portion 100 and a power portion 102 to the first input 70 of the control circuit 52.

The firing mode is entered when an accident occurs. The processing unit 66 supplies the encoded input signal comprising a four pulse code portion 100 and the power portion 102 to the control circuit 52. Once the control circuit 52 has determined that the code portion 100 is valid, the switch 78 is enabled and the power portion 102 of the encoded input signal is provided to the igniter element 54. The power portion 102 does not have sufficient energy to fire the igniter element 54. At the same time, the processing unit 66 provides a control signal to the control input of the high side switch 56 and the switch 58 is closed so that power from the battery voltage Vbat or reservoir capacitor 62 is supplied to the igniter element 54 which fires the igniter element 54.

If there is no firing order, the control circuit 52 and igniter element 54 are not supplied with any current. The stand-by consumption is therefore zero.

The diagnostic mode is entered under the control of the processing unit 66. During the diagnostic mode, the high side switch 56 and switch 58 remain open so that no power is supplied by the battery voltage Vbat or reservoir capacitor 62. The processing unit 66 supplies the encoded input signal comprising a four pulse code portion 100 and the power portion 102 to the control circuit 52. Once the control circuit 52 has determined that the code portion 100 is valid, the switch 78 is enabled and the power portion 102 of the encoded input signal is provided to the igniter element 54. In the diagnostic mode, the power portion 102 comprises a low current signal to verify the integrity of the logic means 74 itself as well as the integrity of the igniter element 54 (open, short circuit and resistance of igniter element). The current signal must be low enough to limit the heat generation of the igniter element 54 which could alter the chemical nature of the pyrotechnic material surrounding the igniter element. Since the logic means 74 only allows the igniter element 54 to be fired on receipt of a valid code, the logic means 74 provides protection against ESD and RF perturbations. This means that the resistance of the igniter element 54 can be increased with the result that the voltage signals to be measured in the diagnostic mode have a higher level and can be measured more accurately. Thus, the present invention allows for more accurate diagnostics than the prior art arrangements described above.

The present invention provides a robust, simple control circuit for controlling the power delivered to the igniter element so that only a specific code generated by the processing unit will unlock the igniter system and allow the igniter element to be fired or for diagnostics to be carried out. The enhanced three-level protection provided by the control circuit ensures that bad codes can be detected and the control circuit reset for the next received code.

The simple technique employed by the control circuit in accordance with the invention to determine the validity of a code portion of an encoded input signal means that only simple logic is needed for its implementation which reduces the die size of such a circuit.

Since the control circuit in accordance with the present invention is powered by the encoded input signal supplied by the processing unit, the control circuit and igniter element can be integrated on the same chip and the integrated chip only requires two connection wires. Such a solution is therefore compatible with existing systems.

The control circuit and igniter element may be implemented using CMOS technology which improves noise immunity and tolerance due to power supply variations.

As an optional feature, a full wave rectifier circuit may be coupled across the first 70 and second 72 inputs of the control circuit 52. This optional feature ensures that the control circuit 52 is symnmetrical; it does not matter which way round the first 70 and second 72 inputs are connected.

We claim:

1. A control circuit for controlling power supplied to an igniter element, the control circuit comprising:

a first input for receiving an encoded input signal generated in response to the initiation of a firing mode and a diagnostic mode, the encoded input signal comprising a code portion and a power portion, the code portion comprising n pulses having substantially a predetermined frequency, where n is at least two;

logic means for determining whether the code portion of the received encoded input signal is valid, the code portion being determined valid when the code portion meets predefined conditions within a predetermined time window and for providing an unlocking signal at an output when the code portion is determined to be valid; and a switch having a control input coupled to the output of the logic means, an input coupled to the first input of the control circuit, and an output for coupling to the igniter element, wherein the switch is enabled on receipt of the unlocking signal such that in the firing mode power, including the power portion of the received encoded input signal, at the first input of the control circuit is supplied to the output of the switch for firing the igniter element and in the diagnostic mode the power portion of the received encoded input signal is supplied to the output of the switch for energizing the igniter element.

2. A control circuit according to claim 1 further comprising a power supply coupled between the first input of the control circuit and a second input of the control circuit which second input is coupled to a reference voltage, the power supply deriving energy from the encoded input signal so as to supply power at an output to the logic means.

3. A control circuit according to claim 2 wherein the power supply comprises a diode coupled in series with a capacitor between the first and second inputs of the control circuit the output of the power supply being coupled to a node between the capacitor and diode.

4. A control circuit according to claim 3 further comprising a full wave rectifier circuit coupled across the first and second inputs of the control circuit.

5. A control circuit according to claim 1 wherein the logic means comprises:

a counter having a clock input coupled to the input of the control circuit so as to receive the encoded input signal for counting each pulse in the code portion of the encoded input signal;

a first logic circuit coupled to the counter for determining the number of pulses in the code portion and for providing a valid signal when the code portion is determined to comprise n pulses and a reset signal when the code portion is determined to comprise any other number of pulses;

a second logic circuit coupled to the counter for determining whether the code portion meets predefined conditions within the predetermined time window, the predefined conditions including a condition that the predetermined frequency of the code portion is within a predetermined range, and for providing a valid signal when the predefined conditions are met within the predetermined time window and a reset signal when the predefined conditions are not met within the predetermined time window; and an unlocking circuit coupled to receive the valid signals and reset signals from the first and second logic circuits, for generating the unlocking signal on receipt of the valid signals from both the first and second logic circuits and for being reset in response to receiving a reset signal from one of the first and second logic circuits.

6. A control circuit according to claim 5 wherein n is equal to four such that the code portion comprises four pulses.

7. A control circuit according to claim 6 wherein the counter is clocked by the code portion of the encoded input signal to provide first, second and third output signals, wherein the first logic circuit comprises a third AND logic gate having first and second inputs coupled to receive the first and third output signals provided by the counter and an output for providing the reset signal, wherein the second logic circuit comprises:

a first AND logic gate having first and second inputs coupled to receive respective first and second output signals provided by the counter and an output;

first delay circuit coupled to the output of the first AND logic gate for delaying the signal at the output of the first AND logic gate by a first predetermined delay and for providing a first delayed output signal;

second delay circuit coupled to the output of the first AND logic gate for delaying the signal at the output of the first AND logic gate by a second predetermined delay and for providing a second delayed output signal, the first and second predetermined delays being different so as to define the predetermined time window;

a second AND logic gate having a first input coupled to receive the first delayed output signal, a second inverted input coupled to receive the second delayed output signal and an output;

a fourth AND logic gate having first and second inputs coupled to receive respective first and second delayed output signals and an output for providing the reset signal; and a fifth AND logic gate having a first inverted input coupled to receive the first delayed output signal, a second input coupled to receive the third output signal provided by the counter, a third input and an output for providing the reset signal, and wherein the unlocking circuit comprises:

a latch having a clock input coupled to receive the third signal provided by the counter, a data input coupled to the output of the second AND logic gate, a reset input coupled to receive the reset signals, and an output coupled to the third input of the fifth AND logic gate;

third delay circuit coupled to the output of the latch for delaying the signal at the output of the latch so as to provide a delayed output signal; and a Schmitt trigger coupled to the third delay circuit for generating the unlocking signal when the delayed output signal reaches a predetermined level, the latch being reset on receipt of one of the reset signals such that the unlocking signal is not generated.

8. A control circuit according to claim 7 wherein the logic means further comprises an OR logic gate coupled to the outputs of the third, fourth and fifth AND logic gates, the OR logic gate having an output for providing a reset signal to the reset input of the latch and a reset input of the counter.

9. An igniter device comprising a semiconductor igniter element and a control circuit for controlling power supplied to the semiconductor igniter element, the control circuit comprising:

a first input for receiving an encoded input signal generated in response to the initiation of a firing mode and a diagnostic mode, the encoded input signal comprising a code portion and a power portion, the code portion comprising n pulses having substantially a predetermined frequency, where n is at least two;

logic means for determining whether the code portion of the received encoded input signal is valid, the code portion being determined valid when the code portion meets predefined conditions within a predetermined time window and for providing an unlocking signal at an output when the code portion is determined to be valid; and a switch having a control input coupled to the output of the logic means, an input coupled to the first input of the control circuit, and an output for coupling to the igniter element, wherein the switch is enabled on receipt of the unlocking signal such that in the firing mode power, including the power portion of the received encoded input signal, at the first input of the control circuit is supplied to the output of the switch for firing the igniter element and in the diagnostic mode the power portion of the received encoded input signal is supplied to the output of the switch for energizing the igniter element.

10. A control circuit according to claim 9 further comprising a power supply coupled between the first input of the control circuit and a second input of the control circuit which second input is coupled to a reference voltage, the power supply deriving energy from the encoded input signal so as to supply power at an output to the logic means.

11. A control circuit according to claim 10 wherein the power supply comprises a diode coupled in series with a capacitor between the first and second inputs of the control circuit the output of the power supply being coupled to a node between the capacitor and diode.

12. A control circuit according to claim 11 further comprising a full wave rectifier circuit coupled across the first and second inputs of the control circuit.

13. A control circuit according to claim 9 wherein the logic means comprises:
- a counter having a clock input coupled to the input of the control circuit so as to receive the encoded input signal for counting each pulse in the code portion of the encoded input signal;
- a first logic circuit coupled to the counter for determining the number of pulses in the code portion and for providing a valid signal when the code portion is determined to comprise n pulses and a reset signal when the code portion is determined to comprise any other number of pulses;
- a second logic circuit coupled to the counter for determining whether the code portion meets predefined conditions within the predetermined time window, the predefined conditions including a condition that the predetermined frequency of the code portion is within a predetermined range, and for providing a valid signal when the predefined conditions are met within the predetermined time window and a reset signal when the predefined conditions are not met within the predetermined time window; and
- an unlocking circuit coupled to receive the valid signals and reset signals from the first and second logic circuits, for generating the unlocking signal on receipt of the valid signals from both the first and second logic circuits and for being reset in response to receiving a reset signal from one of the first and second logic circuits.

14. A control circuit according to claim 13 wherein n is equal to four such that the code portion comprises four pulses.

15. A control circuit according to claim 14 wherein the counter is clocked by the code portion of the encoded input signal to provide first, second and third output signals,
- wherein the first logic circuit comprises a third AND logic gate having first and second inputs coupled to receive the first and third output signals provided by the counter and an output for providing the reset signal,
- wherein the second logic circuit comprises:
  - a first AND logic gate having first and second inputs coupled to receive respective first and second output signals provided by the counter and an output;
  - first delay circuit coupled to the output of the first AND logic gate for delaying the signal at the output of the first AND logic gate by a first predetermined delay and for providing a first delayed output signal;
  - second delay circuit coupled to the output of the first AND logic gate for delaying the signal at the output of the first AND logic gate by a second predetermined delay and for providing a second delayed output signal, the first and second predetermined delays being different so as to define the predetermined time window;
  - a second AND logic gate having a first input coupled to receive the first delayed output signal, a second inverted input coupled to receive the second delayed output signal and an output;
  - a fourth AND logic gate having first and second inputs coupled to receive respective first and second delayed output signals and an output for providing the reset signal; and
  - a fifth AND logic gate having a first inverted input coupled to receive the first delayed output signal, a second input coupled to receive the third output signal provided by the counter, a third input and an output for providing the reset signal, and
- wherein the unlocking circuit comprises:
  - a latch having a clock input coupled to receive the third signal provided by the counter, a data input coupled to the output of the second AND logic gate, a reset input coupled to receive the reset signals, and an output coupled to the third input of the fifth AND logic gate;
  - third delay circuit coupled to the output of the latch for delaying the signal at the output of the latch so as to provide a delayed output signal; and
  - a Schmitt trigger coupled to the third delay circuit for generating the unlocking signal when the delayed output signal reaches a predetermined level, the latch being reset on receipt of one of the reset signals such that the unlocking signal is not generated.

16. A control circuit according to claim 15 wherein the logic means further comprises an OR logic gate coupled to the outputs of the third, fourth and fifth AND logic gates, the OR logic gate having an output for providing a reset signal to the reset input of the latch and a reset input of the counter.

17. An igniter system comprising:
- a control circuit for controlling power supplied to an igniter element, the control circuit comprising:
  - a first input for receiving an encoded input signal generated in response to the initiation of a firing mode and a diagnostic mode, the encoded input signal comprising a code portion and a power portion, the code portion comprising n pulses having substantially a predetermined frequency, where n is at least two;
  - logic means for determining whether the code portion of the received encoded input signal is valid, the code portion being determined valid when the code portion meets predefined conditions within a predetermined time window and for providing an unlocking signal at an output when the code portion is determined to be valid; and
  - a switch having a control input coupled to the output of the logic means, an input coupled to the first input of the control circuit, and an output for coupling to the igniter element, wherein the switch is enabled on receipt of the unlocking signal such that in the firing mode power, including the power portion of the received encoded input signal, at the first input of the control circuit is supplied to the output of the switch for firing the igniter element and in the diagnostic mode the power portion of the received encoded input signal is supplied to the output of the switch for energizing the igniter element;
- an igniter element coupled to the output of the switch of the control circuit such that when the control circuit switch is enabled power is supplied to the igniter element;
- a power switch coupled to the first input of the control circuit and a first voltage supply, the power switch when enabled providing a power signal to the first input of the control circuit;

a processing unit for generating the encoded input signal generated in response to the initiation of a firing mode and a diagnostic mode and for providing the encoded input signal to the first input of the control circuit, for providing a control signal to the power switch to enable the power switch in response to the initiation of the firing mode, and for monitoring a voltage signal across the igniter element in the diagnostic mode, wherein in the firing mode the power signal at the first input of the control circuit is supplied with the power portion of the encoded input signal to the igniter element when the control circuit enables the control circuit switch to fire the igniter element, and wherein in the diagnostic mode the processing unit does not enable the power switch wherein only the power portion of the encoded input signal is provided to the igniter element when the control circuit enables the control circuit switch.

* * * * *